United States Patent [19]

Watanabe et al.

[11] Patent Number: 4,608,662
[45] Date of Patent: Aug. 26, 1986

[54] METHOD FOR EDITING DOCUMENT

[75] Inventors: Shigeru Watanabe, Yokohama; Hiroshi Kinukawa, Sagamihara; Kenjiro Mori, Yokohama; Kenji Koichi; Shinji Kimura, both of Kawasaki; Makoto Yamanouchi, Owariasahi; Yasuo Yajima, Kawasaki, all of Japan

[73] Assignees: Hitachi, Ltd.; Hitachi Microcomputer Engineering Ltd., both of Tokyo, Japan

[21] Appl. No.: 586,826

[22] Filed: Mar. 6, 1984

Related U.S. Application Data

[63] Continuation of Ser. No. 317,841, Nov. 3, 1981.

[30] Foreign Application Priority Data

Nov. 7, 1980 [JP] Japan .................................. 55-155860

[51] Int. Cl.⁴ .............................................. G06F 9/00
[52] U.S. Cl. .................................................. 364/900
[58] Field of Search ... 364/200 MS File, 900 MS File

[56] References Cited

U.S. PATENT DOCUMENTS 4,313,159  1/1982  Shoap ................................. 364/200
4,435,776  3/1984  Ratcliffe et al. .................... 364/900
4,464,733  8/1984  Misker et al. ....................... 364/900

Primary Examiner—Gareth D. Shaw
Assistant Examiner—John G. Mills
Attorney, Agent, or Firm—Antonelli, Terry & Wands

[57] ABSTRACT

A method of editing a document comprises displaying a text sentence on the screen of a display unit, bounding an area partly removed of the displayed text sentence and reserved for the display of a figure, calculating a configuration which the bounded area has on the document to be printed, displaying an area having a size in proportion to the configuration on the display screen, drawing the figure within the displayed area, and synthesizing the text sentence and the figure. When drawing the figure on the screen of the display unit, the user can monitor a print image.

9 Claims, 13 Drawing Figures

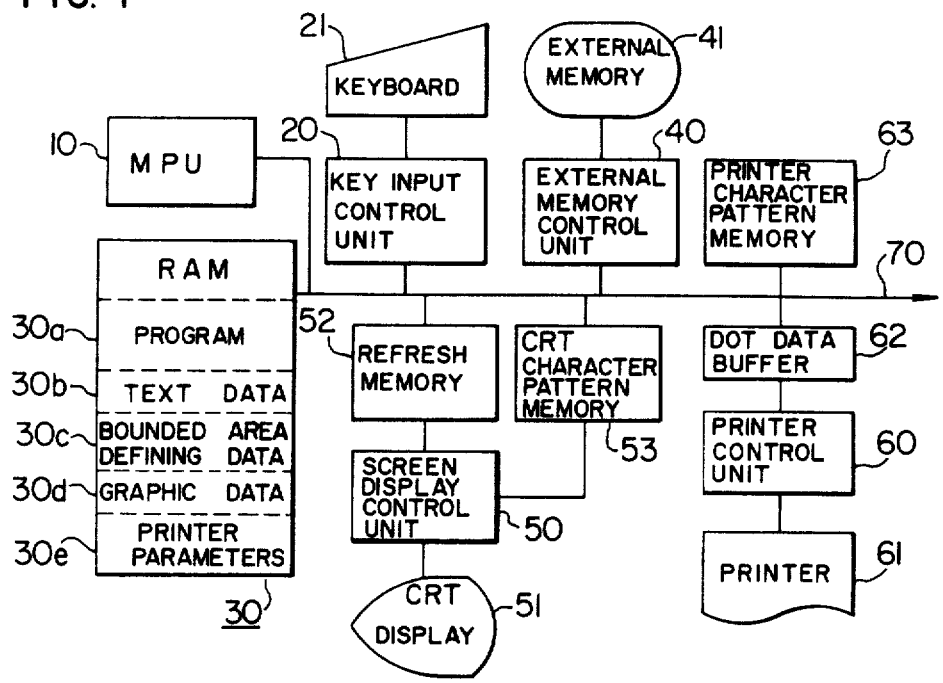

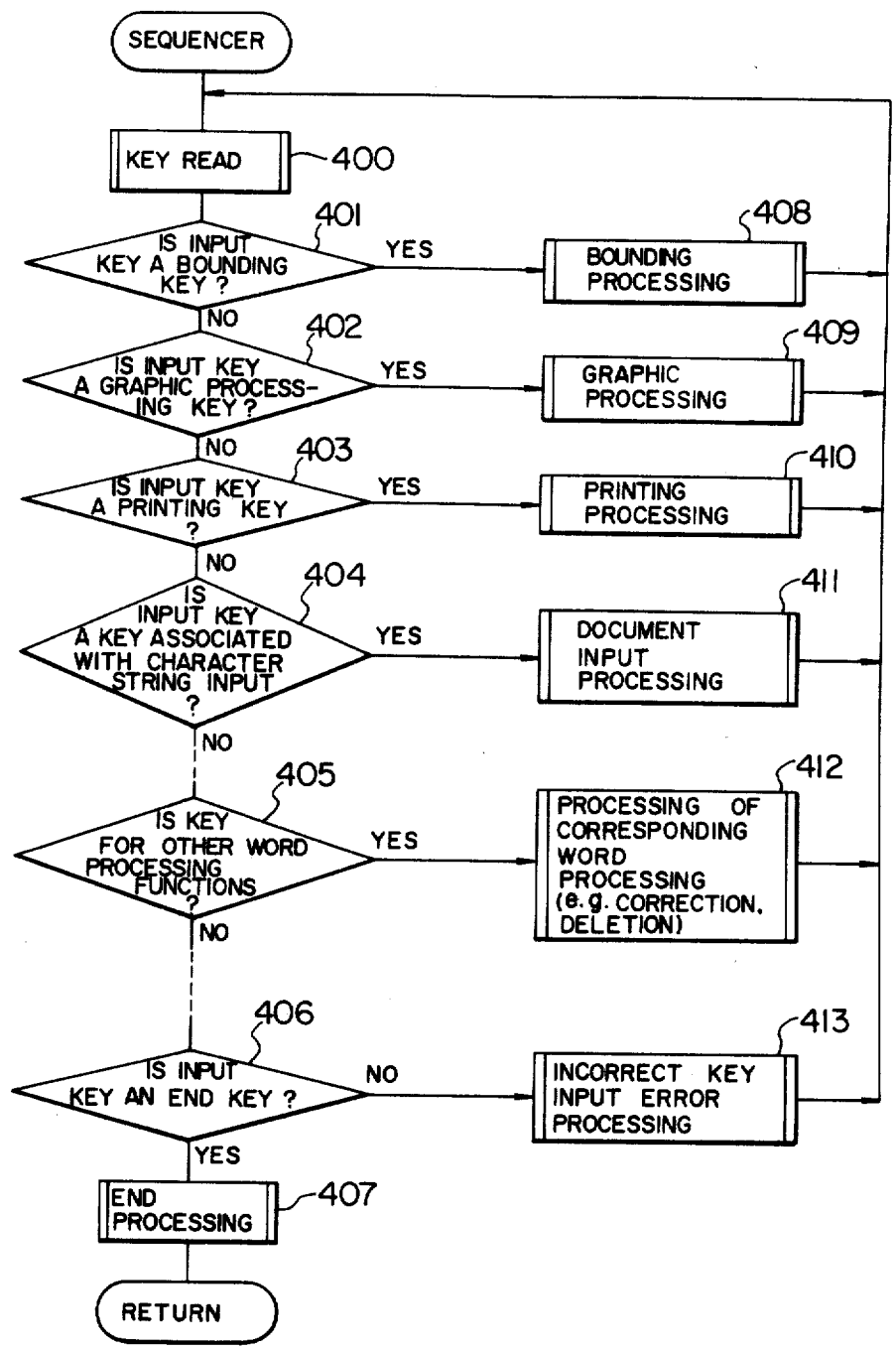

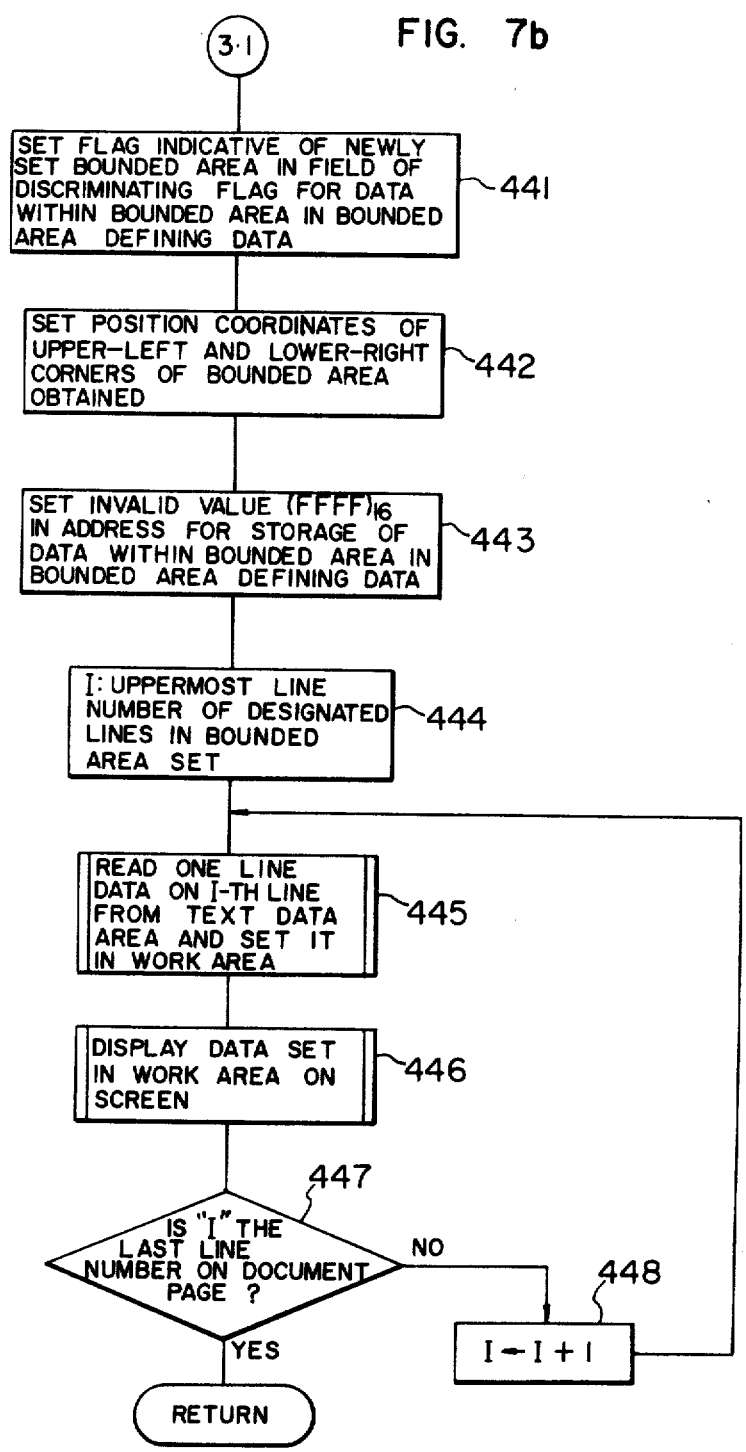

METHOD FOR EDITING DOCUMENT

This is a continuation of application Ser. No. 317,841 filed Nov. 3, 1981.

This invention relates to a method for editing a document through which text sentences and figures can be prepared and printed on a sheet of document paper.

Word processors are gaining today a widespread use but many of them are limited to handle characters only. The word processor has of course a word processing function including indent, tab, margin and the like modes. The validity of such a function is, however, confined to processing of a character string. Incidentally, in many reports prepared in the office, not only a character string but also a layout of figures and tables within a suitable area on one page is arranged to provide a document style. Accordingly, when preparing a document containing sentences and figures on one page, the sentence is first prepared with a word processor while reserving an area for the figure and thereafter, the figure prepared by any suitable method and the sentence prepared with the word processor are put together physically.

It is an object of this invention to reduce the overhead of office tasks by permitting systematic handling of character data and graphic data by a word processor and simultaneous printing of coexistent sentences and figures on one page upon printing.

According to the present invention, a document editing method comprises the steps of displaying a text sentence on the screen of a display unit, bounding an area partly removed from the displayed text sentence and reserved for the display of a figure, and filling the figure in the bounded area for synthesis of the text sentence and the figure. A problem encountered therein is that the number of lines and of characters on each line which can be displayed within one screen of the display unit is different from the number of lines and of characters on each line which can be contained in one page of a document printed by a printer. In other words, the line spacing and the number of characters on one line in a printed document are different from those on a display screen. To solve the problem, according to this invention, after calculation is performed to determine a configuration which the bounded area has on the printed document and an area having a size which is proportional to the size of the configuration is displayed on the display screen, the processing for filling the figure in the bounded area is executed. This method of the invention permits the user to monitor a print image when drawing the figure on the screen of the display unit, thereby considerably improving the efficiency of handling.

FIG. 1 is a block diagram showing one embodiment of an apparatus used for implementing a method of the invention.

FIG. 2 is a diagrammatic representation useful in explaining a data format used for implementing the method of the invention.

FIG. 5 is a general flow chart of a program used for implementing the method of the invention.

FIGS. 7a and 7b illustrate a flow chart of bounding processing in FIG. 5.

Figure 3:
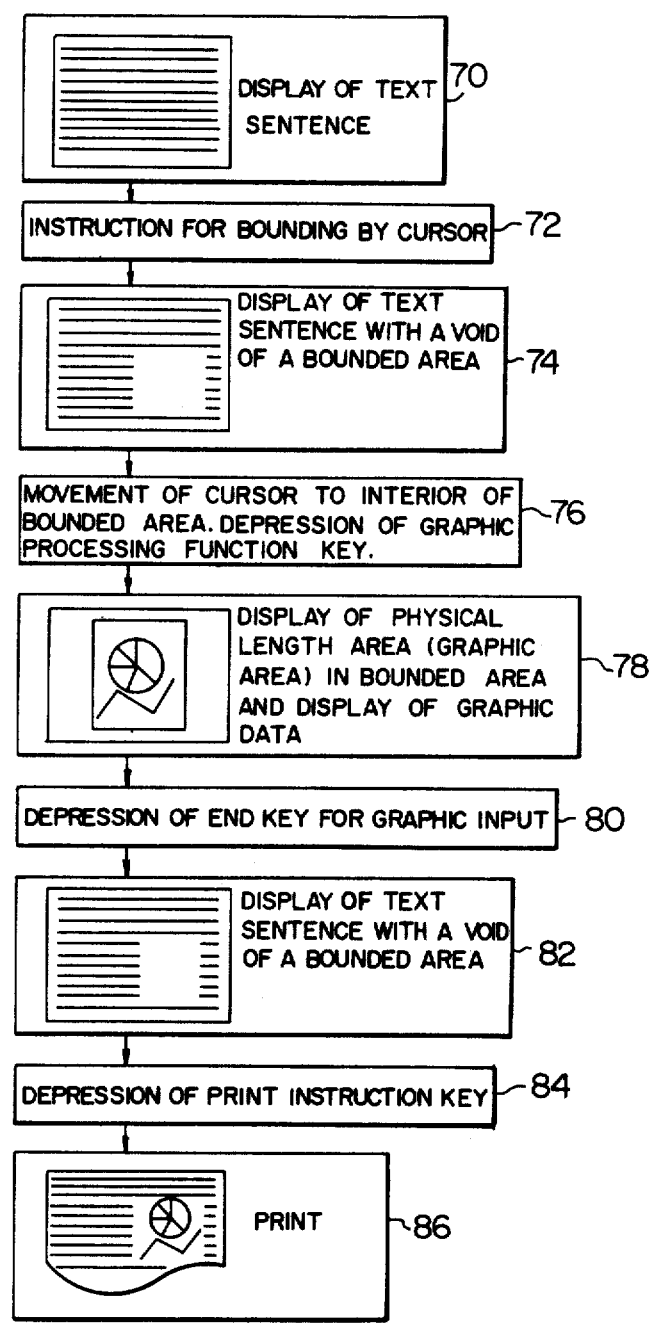
FIGS. 3 and 4 are diagrammatic representations useful in explaining the method of the invention.

Referring now to FIG. 1, an apparatus for implementing an editing method of the invention comprises a microprocessor unit (hereinafter simply referred to as an MPU) 10, and a random access memory (hereinafter simply referred to as a RAM) 30. The RAM 30 has an area 30a for storage of programs, an area 30b for storage of text sentence data, an area 30d for storage of graphic data that defines a figure to be synthesized with a text sentence, an area 30c for storage of bounded area defining data that defines a bounded area in which the figure is displayed, and an area 30e for storage of parameters for a printing format. Instructions for the text sentence and the graphic processing are applied to the apparatus by a keyboard 21. The input from the keyboard is converted into a given code by a key input control unit 20. The apparatus further comprises a refresh memory 52 for storage of an edited text sentence in the form of a code, a memory 53 for storage of a character pattern corresponding to the code, and a CRT display unit 51 for displaying the character pattern from the memory 53 via a display control unit 50. Also included in the apparatus are a print control unit 60 for causing a printer 61 to print a synthesis of a text sentence and a figure, a dot data buffer 62 for storage of a character pattern to be printed on one line, and a printer character pattern memory 63. Each of the CRT character pattern memory 53 and the printer character pattern memory 63 consists of a plurality of first areas for storage of a plurality of predetermined character patterns and a plurality of second areas for storage of part of a figure pattern formed by the MPU 10 as will be described later. The first and second areas store display patterns or print patterns of the same size. Each of these areas is accessed by the character code.

The MPU 10, RAM 30, refresh memory 52, CRT character pattern memory 53, dot data buffer 62, printer character pattern memory 63, and key input control unit 20 as well as an external memory control unit 40 are connected to a common bus 70, and the data exchange is carried out through the bus 70.

Programs for an external memory 41 and the external memory control unit 40 as well as a program for storage into the external memory 41 are principally used to shunt temporarily unnecessary data, thus attaining efficient utilization of the RAM 30. In the following description, the operation of the external memory 41 will only be described as necessary. Involved in the operation of access to the RAM 30 is access to the external memory 41 that is carried out as necessary.

Arranged on the keyboard 21 are cursor keys 200 for moving a cursor of the display unit 51, a function key 201 for bounding, a function key 202 for graphic processing, a function key 203 for printing, ten keys 206, and keys 207 for alphabetical and kana character input. The other function keys 204 and 205 shown in the layout are not directly related to the method of the present invention and will not be detailed. In the storage area 30a of the RAM 30, programs as shown in FIGS. 5, 6, 7a, 7b, 8a, 8b, 8c and 9 are stored and in the storage areas 30c, 30d and 30e, data as shown in FIG. 2 is stored as will be described later.

Various modes in the method of the invention will now be described.

DOCUMENT INPUT PROCESSING

Figure 6:
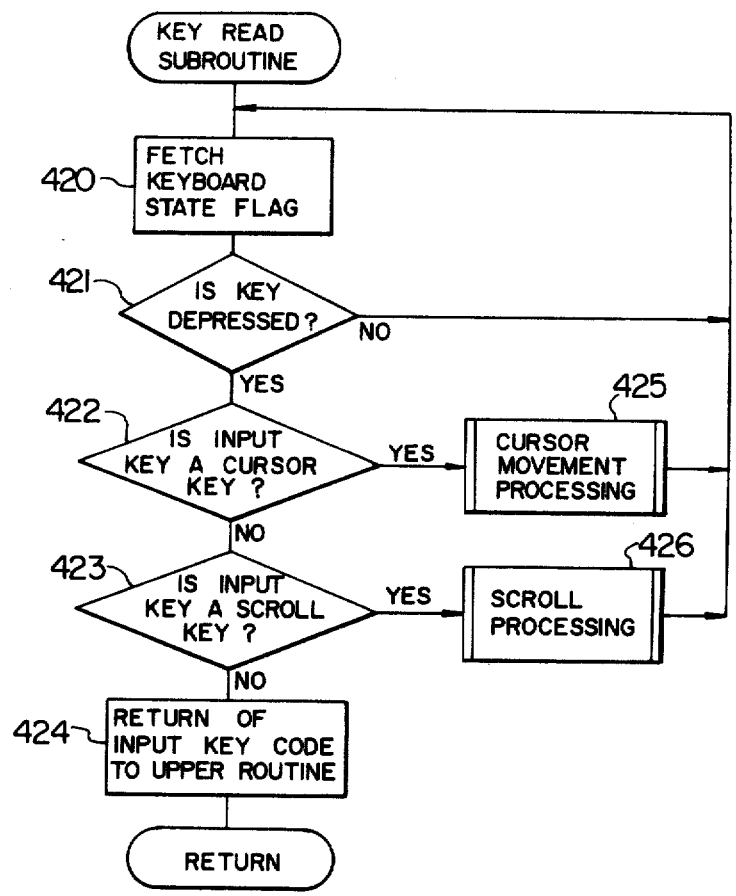
FIG. 6 is a flow chart showing a subroutine of a key read step in FIG. 5.
Figure 10:
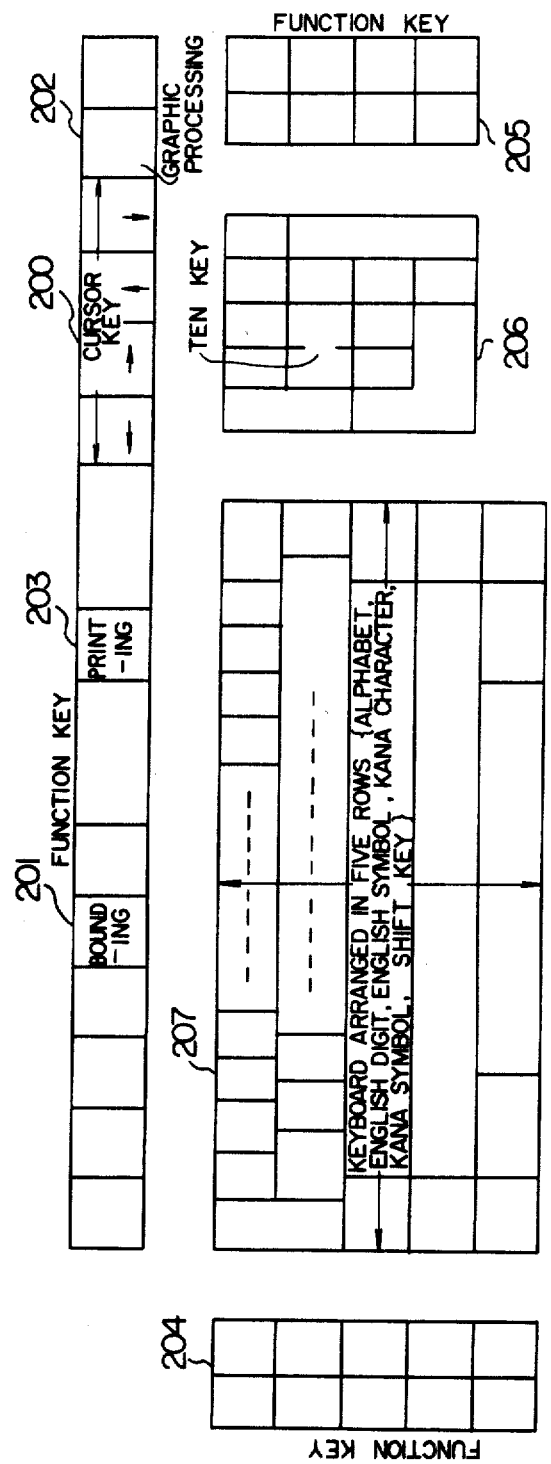
FIG. 10 illustrates a key layout on a keyboard in FIG. 1.

When a key on the keyboard 21 is depressed, the key read processing is carried out in a routine 400 in FIG. 5. Depression of the function key 201 in FIG. 10 causes the program to proceed to the bounding processing in a routine 408 and depression of the function key 202 causes the program to proceed to the graphic processing in a routine 409. Further when the function key 203 is depressed, the program proceeds to the print processing in a routine 410. To input a text sentence, the keys 207 arranged in five rows are used. In this case, the program proceeds to the document input processing in a routine 411. The program for the document input processing per se is known and will be described briefly. Additionally, processings for correction, deletion and the like of the input text sentence are executed in a routine 412, an error processing for incorrect key inputs is executed in a routine 413, and an end processing is executed in a routine 407. Also, the key read processing in routine 400 is executed in accordance with a flow chart as shown in FIG. 6. However, these processings are not directly related to the subject of the present invention and will not be described in greater detail.

The input text data from the keyboard 21 is temporarily stored in the text data area 30b of the RAM 30 and is then edited by a screen editorial processing program into a format suitable for display on the screen as will be described in greater detail. The edited character string (sentence) is written, in the form of the character pattern code, into the refresh memory 52. Character patterns corresponding to the character pattern code in the refresh memory 52 are read by the screen display control unit 50 and sequentially displayed on the CRT display 51. In this way, the text sentence is displayed on the CRT display 51 (block 70 in FIG. 3).

In general, the number of lines on one page and of characters on one line which can be described on one page of a printed document is larger than the number of lines and of characters on one line which can be displayed within the screen of the CRT. In other words, only part of a document being prepared on one page can be displayed on the screen. In addition, the position of lines and characters on each line in a document on one page are different from the position of lines and characters on each line to be displayed on the CRT screen.

To obviate the difference, the screen editorial processing program has functions as described below.

(1) The line position and the character position on a line of a cursor which are obtained when the cursor position is read from the refresh memory 52 and displayed on the screen can be converted into the line position and the character position on the line in a document on one page. Conversely, the position coordinates in the document page can be converted into the position coordinates on the screen and the cursor can be set to a location corresponding to the latter coordinates in the refresh memory 52.

(2) Request for display of a character string associated with a line position and a character position on the line in the document page can be converted into a request for display of a corresponding line position and character position on the line on the screen and displayed on the screen at the corresponding positions.

(3) A character string can be scrolled vertically and horizontally so that any portion of the character string within a document on one page can be observed on the screen.

By preparing a table which defines the correspondence between the character string being displayed on the screen and the character string position in the document page, the above functions can be constructed in the screen editorial processing program.

As described above, the screen can be taken for a window through which part of the document page can be displayed, and position data such as cursor position data can be handled in terms of the document page.

BOUNDING—PROCESSING FOR FIGURE

Figure 7A:
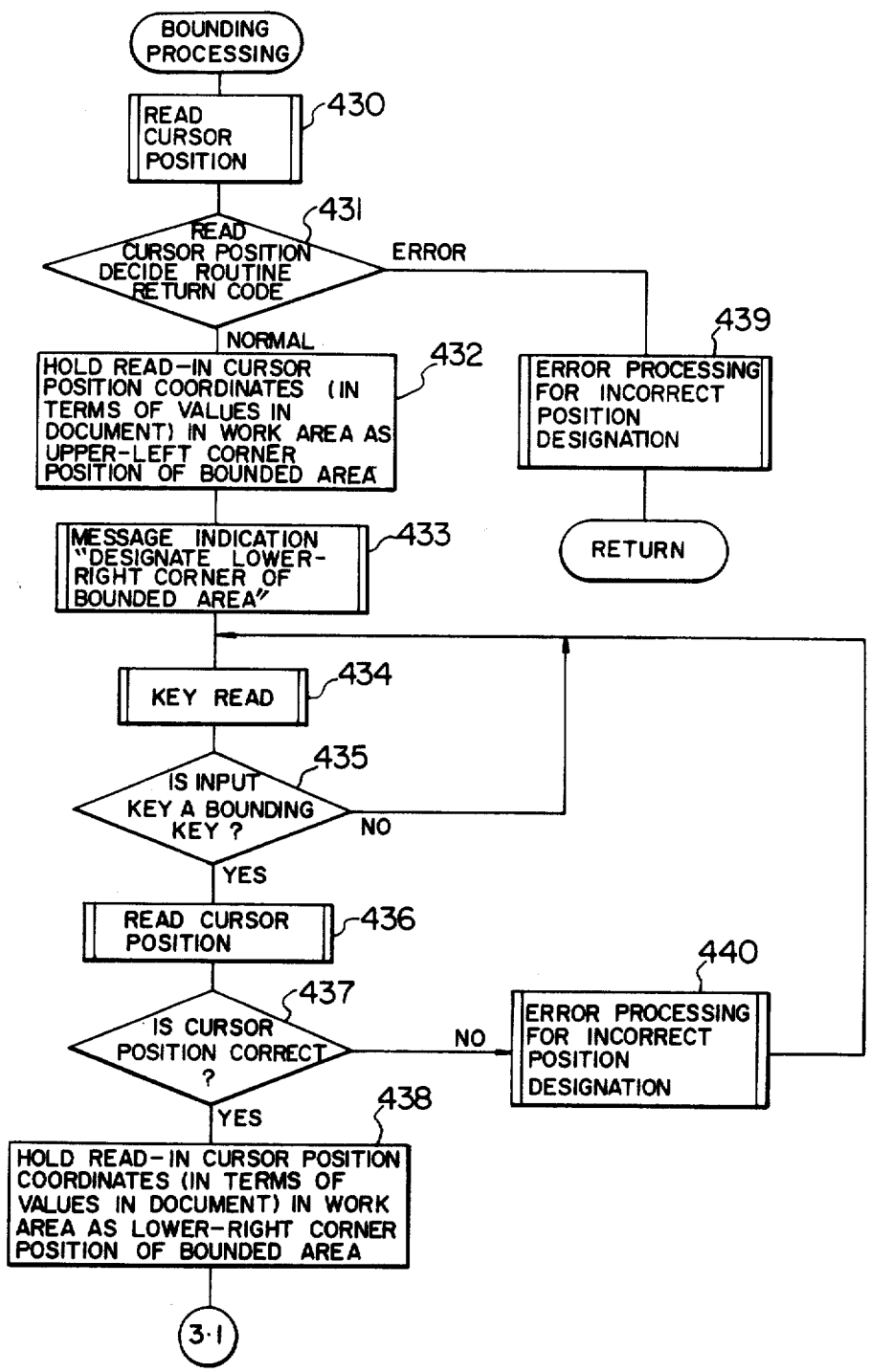

With the screen as mentioned above, the cursor key (200 in FIG. 10) on the keyboard 21 is moved in a well-known manner to bring a cursor to the upper-left corner of an area within which a figure is desired to be displayed. Subsequently, the function key (201 in FIG. 10) on the keyboard 21 dedicated to "bounding" is depressed. This key input is transmitted to the MPU 10 via the key input control unit 20 and a program module for bounding as shown in FIGS. 7a and 7b is executed. During this execution, the above cursor position is first read out of the refresh memory 52 and sent to the MPU 10. The MPU 10 fetches this data, converts it into position coordinates in terms of the document page (line position and character position in the document page) as shown at block 430 in FIG. 7a, and decides whether or not the converted position lies in the document page as shown at block 431 in FIG. 7a. If the converted position is incorrect, the program does not proceed to the subsequent step but a processing for indicating an error message is executed as shown at block 439 in FIG. 7a. The program is then returned to the upper routine (sequencer). If the converted position is correct, the position coordinates are held as shown at block 432 in FIG. 7a, a message indicating "Designate the lower-right corner of the area within which the figure data is desired to be located." is displayed on the CRT screen as shown at block 433 in FIG. 7a, and the user is invited to move the cursor to the predetermined location. Then, the program waits for the next key input as shown at block 434 in FIG. 7a. When the function key dedicated to "bounding" is depressed after the cursor has been moved to the lower-right corner of the bounded area as shown at block 435 in FIG. 7a, the cursor position is immediately read out of the refresh memory 52 and sent to the MPU 10 as shown at block 436 in FIG. 7a, and decision of the position is carried out as in the previous program as shown at block 437 in FIG. 7a. If the decision indicates an incorrect position, an error message is displayed and the program awaits depression of the "bounding" key at a correct position as shown in a loop tracing blocks 437, 440, 434, 435, 436 and 437. If the decision indicates the correct position, coordinates of this position are held as shown at block 438 in FIG. 7a. Through the man-machine interaction, coordinates of the line and character position on the line at the upper-left and lower-right corners of the bounded area can be determined. As will be described later, the coordinates are stored, as data concerning the bounded area at the coordinates, in the bounded area defining data area 30c of the memory 30.

The bounded area defining data is stored in the RAM 30 with a format as shown at 30c in FIG. 2 corresponding to individual bounded areas.

More particularly, a flag for discriminating whether graphic data to be printed within the bounded area has already been stored in the graphic data area 30d of the RAM 30 or whether the bounded area is blank due to absence of the graphic data is stored in a field 302 (a) as shown at block 441 in FIG. 7b.

And, the previously determined line position and the character position on the line in terms of the document page at the upper-left and lower-right covers are stored in fields 302(b) to 302(e) as shown at block 442 in FIG. 7b. If the graphic data to be printed within the bounded area has already been stored in the graphic data area 30d of the RAM 30, the storage address is stored in a field 302 (f). This storage address is invalidated when the graphic data is not yet present, that is to say, the bounded area is blank, as shown at block 443 in FIG. 7b.

Where a plurality of bounded areas are present on the display screen, the above handling is repeated.

In this manner, the designation of the bounded area by means of the cursor as shown at 72 in FIG. 3 is completed.

Thereafter, the control moves to a program for the aforementioned screen display editorial processing. In this program, the MPU 10 edits, based on the bounded area defining data, the text data in such a manner that the text data inside the bounded area. To display a text sentence having a void for the bounded area, a character code is sent to the refresh memory 52. The screen display control unit 50 reads a character pattern from the CRT character pattern memory 53 and sends it to the CRT display 51, so that the text sentence having the void can be displayed on the screen of the CRT display 51, as shown at 74 in FIG. 3 and at blocks 444, 445, 446, 447 and 448 in FIG. 7b. Through the above processing, the text sentence is displayed at an area other than the void reserved for the bounded area on the display screen, and the text data and bounded area defining data are stored in the storage areas 30b and 30c of the RAM 30, respectively. The apparatus then awaits the next key input as shown at 400 in FIG. 5.

Another premise on which the invention is based, i.e., the print format parameters as shown at 30e in FIG. 2 will now be described.

Figure 4:
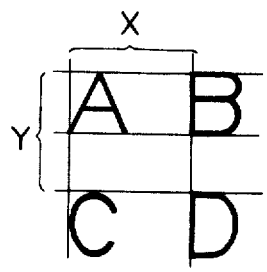

The text sentence is prepared in accordance with a suitable format containing line pitch and character pitch selected from some available varieties to assure easy visibility upon printing and is printed in accordance with the selected format. As shown in FIG. 4, the line pitch Y and the character pitch X are selected and designated by the user prior to defining the graphic data and are held respectively in units of dot number/line and dot number/character in fields 304(a) and 304(b) of the print format parameter area 30e of the RAM 30. It should be understood that when printing, the size of the area for graphic display as set previously varies in accordance with the selected line pitch and character pitch. The other print parameters such as lefthand margin and the like are not related directly to the subject of the present invention and hence they are herein simply referred to as being stored into a field 304 (c) in FIG. 2 reserved for "the other parameters".

GRAPHIC PROCESSING

Now, the manner of controlling the filling of graphic data in a document, which is the subject of the present invention, will be described.

Through the previous processings, as described above, the apparatus is now ready for receiving any key input relating to the document editing.

Transfer to the graphic processing is carried out in a manner as described below.

The cursor is moved to the bounded area as determined through the previous processings and located inside the bounded area. The function key (202 in FIG. 10) dedicated to "graphic processing" is depressed (76 in FIG. 3). This key input is transmitted to the MPU 10 via the key input control unit 20 to start a graphic processing program stored in the RAM 30 (400, 401, 402 and 409 in FIG. 5). This program examines the cursor position at the time when the function key is depressed (460 in FIG. 8a) to decide which bounded area on the document page the cursor position lies in and whether or not the cursor position is outside the bounded area (461, 462, 467 and 468 in FIG. 8a). Since, as described in the foregoing, the position data concerning the individual bounded areas has already been stored in the memory 30 as the bounded area defining data and is supervised, the above decision is performed by comparing the obtained cursor position with this position data. If the comparative decision determines that the cursor is outside the bounded area, indicating an incorrect position designation, an error message is displayed (469 in FIG. 8a) and the program is returned to the upper routine (sequencer). If the comparative decision determines that the cursor position is inside the bounded area, the program acts to calculate the size which the bounded area has when printing in the following manner.

Figure 8A:
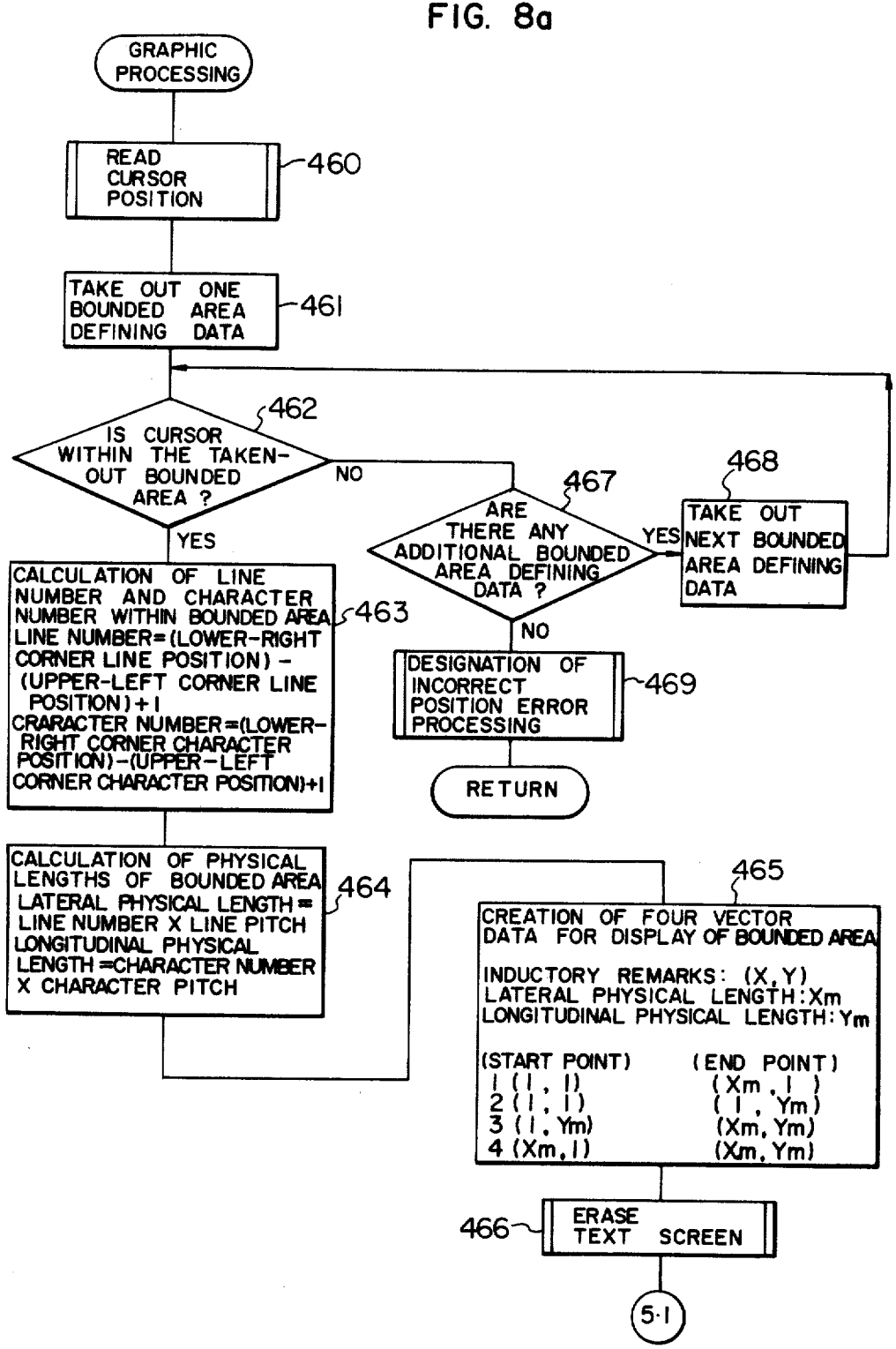
FIGS. 8a, 8b and 8c illustrate a flow chart of a graphic processing in FIG. 5.
Figure 8B:
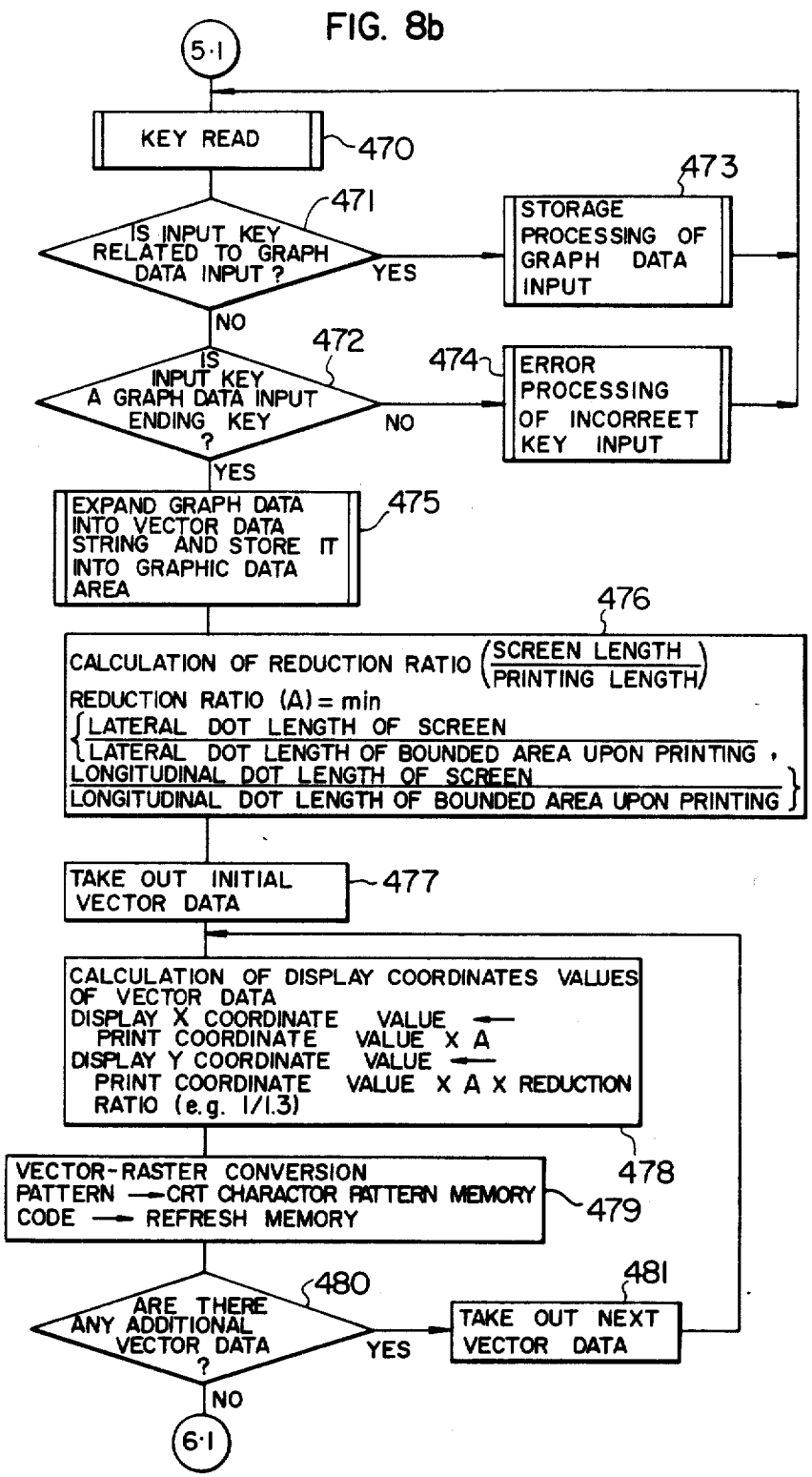

Firstly, the number of lines and of characters on the line in the bounded area is calculated from the line and character position data of the upper-left and lower-right corners of the bounded area stored in the bounded area defining data area of the RAM 30 (463 in FIG. 8a). The longitudinal physical length of the bounded area is calculated from the product of the thus calculated line number and the line pitch stored in the field 304 (a) in the print format parameters, and the lateral physical length of the bounded area is calculated from the product of the thus calculated character number and the character pitch stored in the field 304 (b) (464 in FIG. 8).

The thus calculated longitudinal and lateral physical lengths (dot number) of the bounded area are stored in the field 303(c) of the area 30d of the RAM 30 as part of vector data (i.e., graphic data) within that bounded area. The values of the lengths are also used to generate vector data (constituted by start and end points of a line segment) for displaying of contour lines of the bounded area (465 in FIG. 8a), which vector data (i.e., contour line data) is stored in a suitable work area of the RAM 30 and is used to define an area over which a figure can be drawn. As will be described in greater detail, data for the figure such as, for example, vector data or character string data within the figure is expanded into dot data within the range of physical lengths of the bounded area.

Now, the manner of graphic data input will be described.

At this time, the text data having the void of the bounded area is displayed on the screen but the bounded area in the text displayed when drawing a figure has a size and a longitudinal to lateral ratio which are different from those of a bounded area when printing and cannot be used. Accordingly, for graphic display of a print image, the old text image is erased (a blank code is additionally written in the refresh memory 52) so as to make the CRT screen dedicated to the figure (466 in FIG. 8a).

When taking a graph data input, for instance, for explaining the manner of input, depression of the function key causes the graph data to display a menu of the available types of graph on the CRT screen and the user is allowed to select the type of graph. Based on the selection by the user, a program concerning a predetermined graph data input stored in the RAM 30 is established, which program acts to aid in the input handling (man-machine interaction between the keyboard 21 and the CRT display 51) of data in the graph (for example, percentage in a circle graph (470, 471, 472, 473 and 474 in FIG. 8b)). The thus fetched data in the graph is expanded into a vector data string (consisting of sets of start and end points of segments approximating a curve or straight line) which can be confined in the size of the bounded area previously set and stored in the graphic data of the field 303 (c) of area 30d in FIG. 2 (475 in FIG. 8b). Following completion of storage of the vector data, the next vector data is converted to dot data and a program for displaying the dot data on the CRT screen is started. This program serves to effect the following items (476, 477, 478, 479, 480 and 481 in FIG. 8b).

(1) Each vector is reduced in scale at a suitable ratio (the same reduction ratio for longitudinal and lateral lengths) such that the size of the bounded area in terms of the dot length when printing can be confined in the display area on the CRT display screen.

(2) The dot pitch on the CRT screen is larger (for example, by 1.3 times) in the longitudinal direction than in the lateral direction whereas the dot pitch on the printer is the same in the longitudinal and lateral directions. As a result, the longitudinal to lateral ratio of the dot pitch to be displayed is different between the CRT and the printer. For example, a bounded area which is square when printing is not square on the screen owing to the difference in longitudinal to lateral ratio. To correct the difference, the longitudinal coordinate value of each vector data is reduced at a reduction ratio (in this example, 1/1.3 times) or conversely, the lateral coordinate value is enlarged at the enlargement ratio (in this example, 1.3 times). The scale reduction is applied to individual coordinate values of the vector data representing the bounded area and of the vector data of the field 303 (c) in the graphic data area 30d in FIG. 2. Thereafter, dot expansion of the vector data is carried out. The dot expansion is effected by generating a dot pattern of a segment of a figure positioned at an area for one character display on the CRT screen (hereinafter, the area is called "a display cell"). The expanded dot data is stored in the second area, segmented from the first area, for storage of the character of the CRT character pattern memory 53 and a corresponding code is generated which in turn is written into a corresponding position in the refresh memory 52.

Figure 8C:
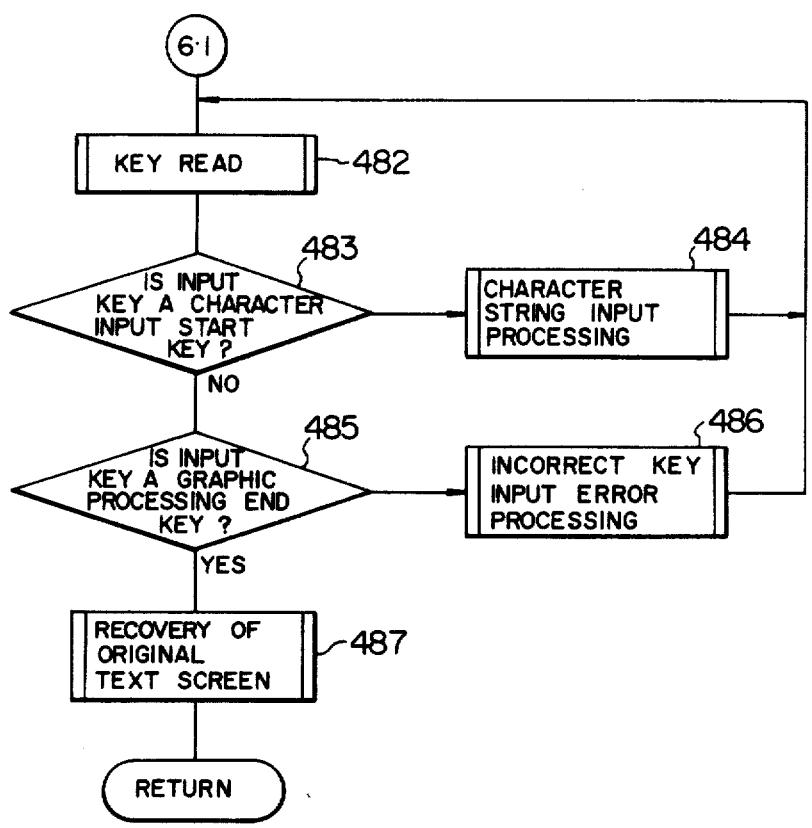

Subsequently, a character string data input is applied to the figure (at present, only line segments are displayed) (482, 483, 484, 485 and 486 in FIG. 8c). The character string data input is applied by means of the keyboard 21 in accordance with a program for preparation of a character string usually incorporated in a word processor. The character string data input is distinguished from the text data and stored as character data within the figure in the field 303 (c) of the graphic data area 30d in FIG. 2. To display the character string, the CRT character pattern memory 53 is used as described above, and the position data (line position and character position on the line) of the character string is supervised in terms of the CRT display position. When printing, the position data is converted into the dot position of the print start in accordance with the reduction ratio or flattering ratio as described above. The refresh memory 52 has a so-to-speak single layer structure and a certain position on the screen corresponds to only one code or one pattern. Accordingly, the line segment pattern is not superimposed on the character pattern on a display cell on the screen. When the segment competes with the character on the same display cell, the program acts to give preference to the character so that the character code is written into the refresh memory 52. Thus, the MPU 10 first executes a processing of writing the line segment pattern code into the refresh memory 52 and thereafter it is renewed to write the character code into the refresh memory 52. The aforementioned program through which the vector data is converted into dot data and displayed on the CRT screen is materialized in this manner and the bounded area having the same longitudinal to lateral ratio as that of the bounded area to be printed can be displayed (78 in FIG. 3).

Through the above processings, the graphic display (30d in FIG. 2) is completed.

Details of the graphic data are as follows.

(1) Data discrimination (303 (a))

The contents (303 (c)) of data are discriminatively classified into the following items.

(a) Information common to graphic data

Longitudinal and lateral physical lengths, reduction ratio, flattering ratio and the like of a bounded area.

(b) Vector data string

Consisting of start and end points. Coordinate values of these points are represented in terms of the dot length of the bounded area when printing.

(c) Character data string within figure

Consisting of position coordinates and character code string.

(2) Pointer (303 (b))

To make a plurality of graphic data successive, the address in the pointer field is held in the presence of data to follow. In the absence of the data to follow, a data representative of ending is written into the pointer field.

(3) Data (303 (c))

As described in item (1).

The heading address of the above data is held in an address for storage of data within a bounded area (302 (f)) of the bounded area defining data 30c. In the foregoing, the method was described on the premise that the graphic data is prepared within the bounded area. Similarly, in the case where graphic data has already been stored for a bounded area when the bounded area is found, the graphic data may be displayed immediately on the screen.

With the method described so far, it is possible to supervise systematically three types of data, i.e., text data, bounded area data and graphic data in the RAM 30. Finally, when the key (80 in FIG. 3) dedicated to "end of graphic processing" is depressed, the original text sentence having the void of the bounded area is displayed on the screen (82 in FIG. 3 and 482, 483, 485 and 487 in FIG. 8c).

PRINTING PROCESSING

Figure 9:
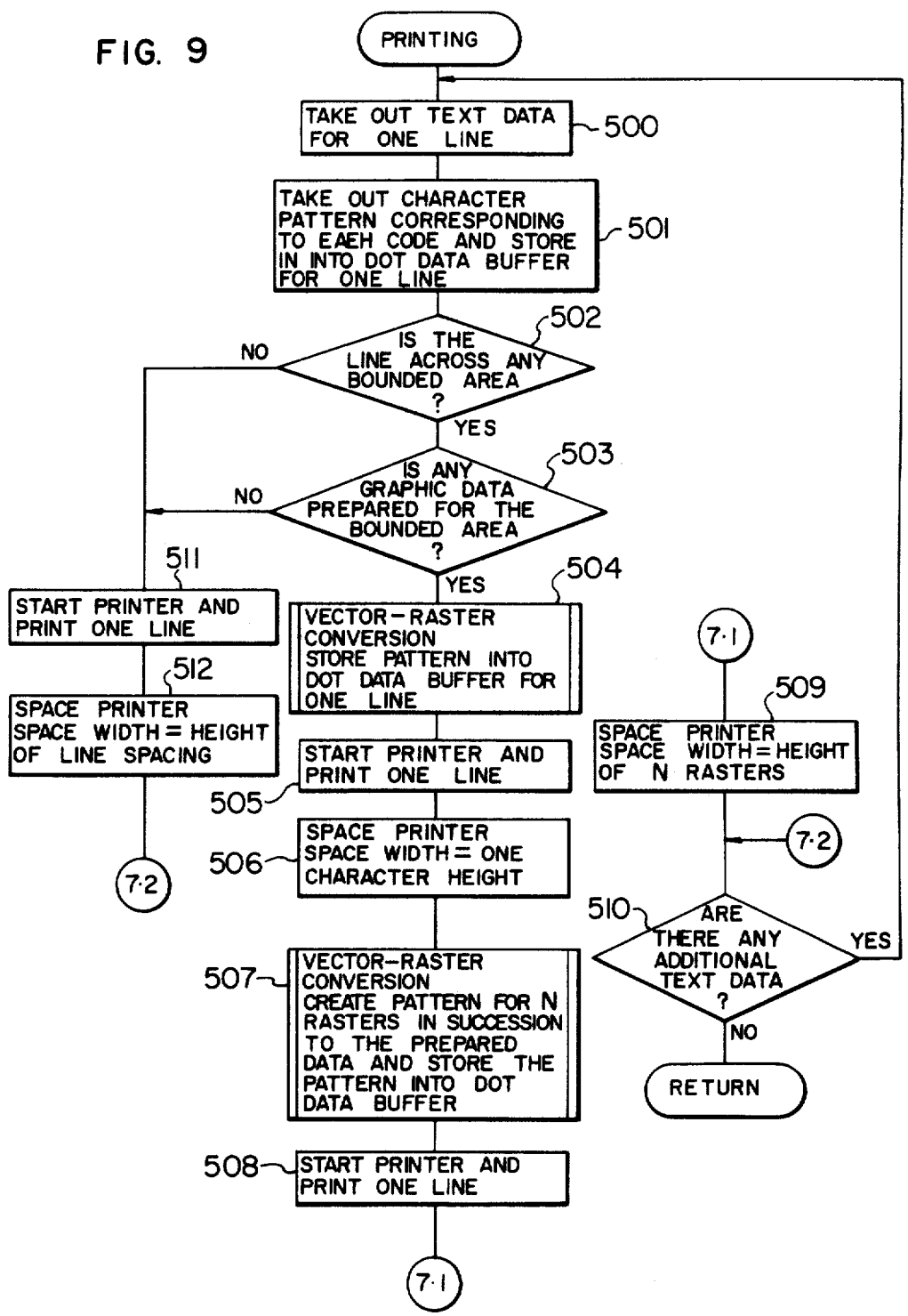
FIG. 9 illustrates a flow chart of a print processing in FIG. 5.

When the key (203 in FIG. 10) dedicated to print start is depressed for printing (84 in FIG. 3), a program concerning printing stored in the RAM 30 is started (400, 401, 402, 403 and 410 in FIG. 5) and the program acts to provide the text sentence in the form of code data by simultaneously referring to the text sentence, bounded area and figure (500 in FIG. 9). Then, based on the code data, a corresponding character pattern is read out of the printer character pattern memory 63 and stored into a given position of the dot data buffer 62 for one line (501 in FIG. 9). Further, the bounded area defining data 30c participates in the decision as to whether or not the output print line is across a bounded area (502 in FIG. 9). In the presence of a bounded area within which graphic data is present (503 in FIG. 9), the graphic data (vector data) is expanded into dot data which is stored in the dot data buffer (3 along with the text sentence data (504 in FIG. 9)). When printing, the expansion of the dot pattern is different from the expansion for display in that it dispenses with the handling of reduction. Thereafter, one line is transmitted via the print control unit 60 to the printer 61 and printed thereby (86 in FIG. 3 and 505 in FIG. 9). A scanning type printer such as a wire dot matrix printer is taken for the printer 61 is this example.

Thereafter, the printer is spaced by a height of one character such as character A or B in FIG. 4 (506 in FIG. 9) to print a figure in succession to the figure previously printed. Subsequently, the printer is spaced by the difference between the line pitch Y (FIG. 4) and the height of one character to repeat printing of the character and graphic pattern on the second character line (507, 508, 509 and 510 in FIG. 9).

Of course, for a line without coexistence of the character pattern and graphic pattern and with only the character pattern, the printer may be spaced by the line spacing (511 and 512 in FIG. 9). For a line with coexistence of the graphic pattern and character pattern, it may be effective to first print only the character pattern and thereafter to bring the graphic pattern on the same line without causing the printer to space.

In the foregoing embodiment, when displaying the area in which the figure is drawn, the text sentence having the void of the bounded area was not displayed but only the bounded area reserved for drawing the figure was displayed, as shown at 78 in FIG. 3. But in some cases, a bounded area reserved for drawing a figure having a size in proportion to the bounded area as shown at 74 in FIG. 3 may be displayed within the latter bounded area and the figure may be drawn within the former bounded area.

In the foregoing embodiment, the graphic data was supervised in the form of the vector data but the method of the present invention may easily be realized with graphic data other than the vector data such as, for example, image data delivered from a facsimile device or the like.

What is claimed is:

1. A method for editing a page of a document containing a synthesis of a multi-line text sentence having a predetermined line pitch and character pitch and a desired graphic figure by using a document editing apparatus including an output unit and a display unit having a display screen, in which the line pitch and the character pitch of the text sentence displayed on each line of said display unit are different from the character line pitch and the character pitch of the text sentence produced on each line by said output unit, said method comprising:

a first step of designating a first area on said display unit for accommodating a desired graphic figure within the same page;

a second step of determining coordinates of the designated first area and providing a layout of the text sentence so that the text sentence will appear in an area of the display screen of said display unit outside said first area;

a third step of displaying on the display screen of said display unit the text sentence whose layout is provided in said second step;

a fourth step of converting said first area into a second area having a size which is defined on the basis of the relationship between the line pitch and the character pitch in said display unit and the line pitch and the character pitch in said output unit, respectively;

a fifth step of forming in the second area a desired graphic figure having longitudinal and lateral dimensions such that the entire figure can be included within the second area; and a sixth step of outputting from said output unit the graphic figure formed in said fifth step together with the text sentence whose layout is provided in said second step.

2. A method for editing a document according to claim 1, wherein said second step comprises:

displaying the text sentence over the entire display screen of the display unit;

determining the coordinates of the designated first area on the display screen of said display unit;

converting the coordinates of the first area into coordinate values in said output unit to determine whether or not the converted coordinate values are within a predetermined output range; and rearranging the text sentence when the converted coordinate values are within the predetermined output range, so that the text sentence is laid out in an area of the display screen of the display unit outside the first area.

3. A method for editing a document according to claim 1 wherein said fourth step comprises:

using the coordinates of at least two corners of said first area on the display screen of said display unit to calculate the size of the first area in connection with the number of lines and the number of characters on one line of the text sentence within the first area; and determining the size of the second area on the basis of the product of the line spacing of a predetermined output format of said output unit and said calculated number of lines and from the product of the character pitch of the predetermined output format of said output unit and said calculated number of characters on one line.

4. A method for editing a document according to claim 3, further comprising between said fourth and fifth steps:

erasing the text sentence displayed on the display screen of said display unit in said third step;

calculating the longitudinal and lateral dimensions of the second area at a first ratio of reduction or enlargement so that the size of the second area is confined in the display area of said display unit;

reducing or enlarging one of the calculated longitudinal and lateral lengths of the second area at a second ratio of a fixed value determined by the ratio between the dot pitch of said display unit and the dot pitch of said output unit to obtain data defining a corrected second area; and displaying the corrected second area on the display screen of said display unit on the basis of the corrected second area defining data.

5. A method for editing a document according to claim 4, wherein said fifth step comprises:
converting vector data contained in the graphic data to be displayed in the second area into vector data having a size confined in the second area;
calculating the vector data at said first ratio of reduction or enlargement;
reducing or enlarging one of the calculated vector data representative of the longitudinal and lateral lengths to obtain corrected graphic data; and
displaying the desired graphic figure within the second area on the display screen of said display unit on the basis of the corrected graphic data.

6. A method for editing a page of a document containing a synthesis of a multi-line text sentence having a predetermined line pitch and character pitch and a desired graphic figure by using a document editing apparatus including an output unit and a display unit having a display screen, in which the line pitch and the character pitch of the text sentence displayed on each line of said display unit are different from the character line pitch and the character pitch of the text sentence produced on each line by said output unit, said method comprising:
a first step of designating a first area on said display unit for accommodating a desired graphic figure within the same output page;
a second step of converting said first area into a second area having a size which is defined on the basis of the relationship between the line character pitches in said display unit and the line and character pitches in said output unit, respectively, and providing a layout of the text sentence so that the text sentence will appear in an area of the display screen of said display unit outside said second area;
a third step of displaying on the display screen of said display unit the text sentence whose layout is provided in said second step;
a fourth step of forming in the second area a desired graphic figure having longitudinal and lateral lengths such that the figure can be included within the second area; and
a fifth step of outputting on said output unit the graphic figure formed in said fourth step together with the text sentence whose layout is provided in said second step.

7. A method for editing a document according to claim 6, wherein said second step comprises:
displaying the text sentence over the entire display screen of said display unit; and
rearranging the text sentence so that the text sentence is laid out in an area of the display screen of said display unit outside the second area.

8. A method for editing a document according to claim 7, further comprising between said third and fourth steps:
erasing the text sentence displayed on the display screen of said display unit in said third step;
calculating the longitudinal and lateral lengths of the second area at a first ratio of reduction or enlargement so that the size of the second area is confined in the display area of said display unit;
reducing or enlarging one of the calculated longitudinal and lateral lengths of the second area at a second ratio of a fixed value determined by the ratio between the dot pitch of said display unit and the dot pitch of said output unit to obtain data defining the corrected second area; and
displaying the corrected second area on the display screen of said display unit on the basis of the corrected second area defining data.

9. A method for editing a document according to claim 8, wherein said fourth step comprises:
converting vector data contained in graphic data to be displayed in the second area into vector data having a size confined in the second area;
calculating the vector data at said first ratio of reduction or enlargement;
reducing or enlarging one of the calculated vector data representative of the longitudinal and lateral lengths to obtain corrected graphic data; and
displaying the desired graphic figure within the second area on the display screen of said display unit on the basis of the corrected graphic data.

* * * * *